United States Patent
Longueville et al.

(10) Patent No.: US 9,689,484 B2
(45) Date of Patent: Jun. 27, 2017

(54) DIFFERENTIAL CONTROL SYSTEM FOR A MOTOR VEHICLE

(75) Inventors: François Longueville, Saint Genis Laval (FR); Philippe Crave, Lyons (FR)

(73) Assignee: Volvo Truck Corporation, Göteborg (SE)

( * ) Notice: Subject to any disclaimer, the term of this patent is extended or adjusted under 35 U.S.C. 154(b) by 210 days.

(21) Appl. No.: 14/394,274

(22) PCT Filed: May 2, 2012

(86) PCT No.: PCT/IB2012/001026
§ 371 (c)(1),
(2), (4) Date: Oct. 14, 2014

(87) PCT Pub. No.: WO2013/164656
PCT Pub. Date: Nov. 7, 2013

(65) Prior Publication Data
US 2015/0087465 A1 Mar. 26, 2015

(51) Int. Cl.
*B60K 23/04* (2006.01)
*F16H 48/20* (2012.01)
*G05G 1/08* (2006.01)
*B60K 23/08* (2006.01)

(52) U.S. Cl.
CPC ............. *F16H 48/20* (2013.01); *B60K 23/04* (2013.01); *B60K 2023/046* (2013.01); *B60K 2023/0841* (2013.01); *B60Y 2200/14* (2013.01); *F16H 2048/204* (2013.01); *G05G 1/08* (2013.01)

(58) Field of Classification Search
None
See application file for complete search history.

(56) References Cited

U.S. PATENT DOCUMENTS

| | | | | |
|---|---|---|---|---|
| 5,407,024 A | * | 4/1995 | Watson | B60K 17/342 180/197 |
| 5,754,967 A | * | 5/1998 | Inoue | B60T 8/172 180/197 |
| 5,916,051 A | * | 6/1999 | Schleuder | B60K 17/344 475/138 |

(Continued)

FOREIGN PATENT DOCUMENTS

| DE | 102008064021 A1 | 9/2009 |
|---|---|---|
| EP | 0697303 A2 | 2/1996 |

(Continued)

OTHER PUBLICATIONS

International Search Report (Dec. 4, 2012) for corresponding International Application PCT/IB2012/001026.

*Primary Examiner* — Justin Holmes
(74) *Attorney, Agent, or Firm* — WRB-IP LLP

(57) ABSTRACT

A differential control system for a motor vehicle such as a truck including at least one differential includes at least one differential lock which is able to operate the differential into at least a locked or an unlocked state, a controller that controls the differential lock, a manually operable control member freely rotating bidirectionally around at least one axis, an encoder connected to the control member to convert a rotation of the control member into a signal fed to the controller which controls the differential lock in order to operate the differential into a locked or an unlocked state.

20 Claims, 3 Drawing Sheets

(56) References Cited

U.S. PATENT DOCUMENTS

| | | | |
|---|---|---|---|
| 2005/0176543 A1* | 8/2005 | Kirkwood | B60K 17/35 475/5 |
| 2006/0046888 A1* | 3/2006 | Puiu | B60K 17/16 475/151 |
| 2006/0199697 A1* | 9/2006 | Kirkwood | B60K 17/3467 477/5 |
| 2008/0197004 A1 | 8/2008 | Ishigaki et al. | |
| 2009/0166106 A1* | 7/2009 | Batdorf | B60K 6/48 180/24.06 |
| 2011/0230294 A1* | 9/2011 | Yang | B60T 7/122 475/150 |

FOREIGN PATENT DOCUMENTS

| | | |
|---|---|---|
| EP | 2143605 A2 | 1/2010 |
| WO | 2009154553 A1 | 12/2009 |

* cited by examiner

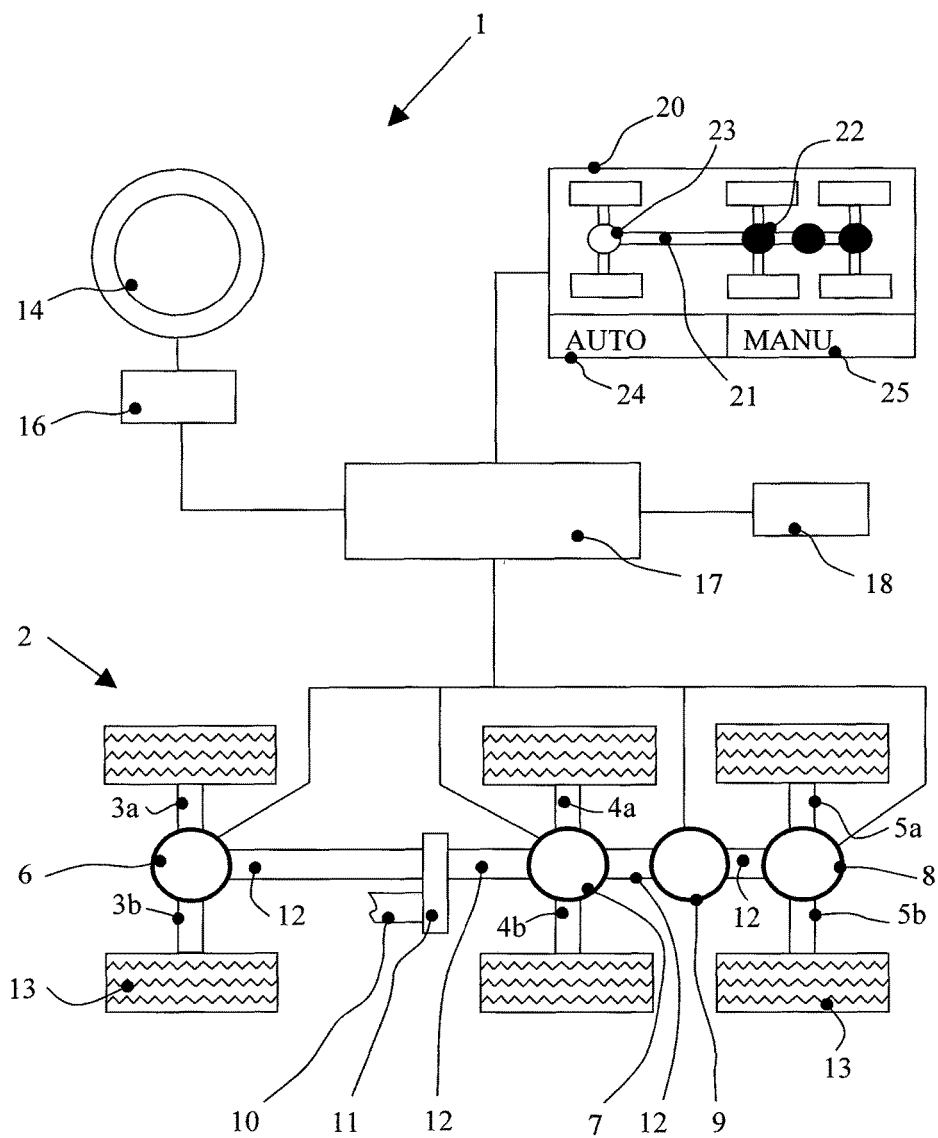
Fig°1

Fig°2-a
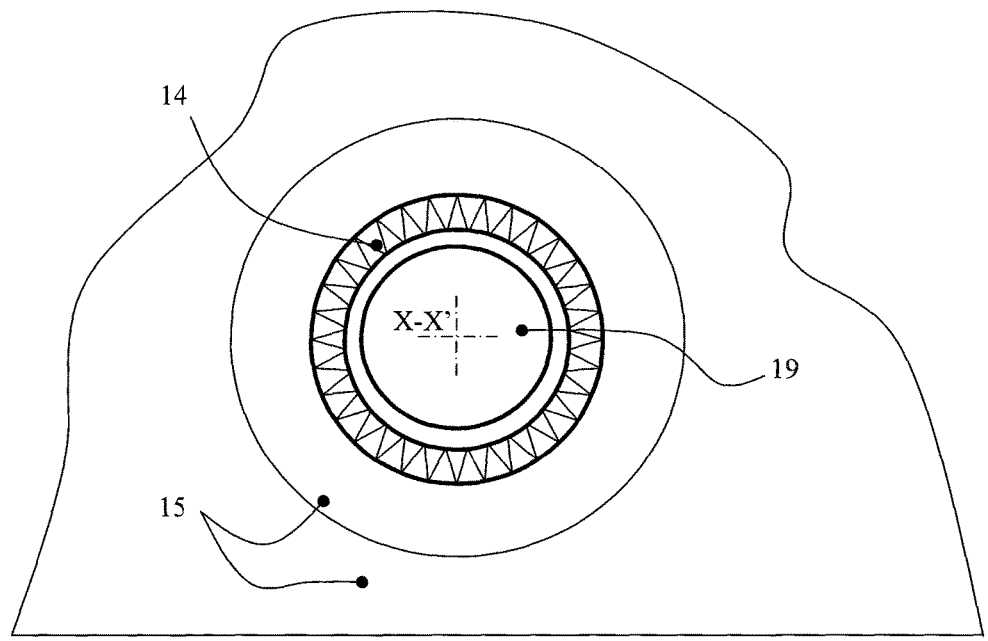
Fig°2-b
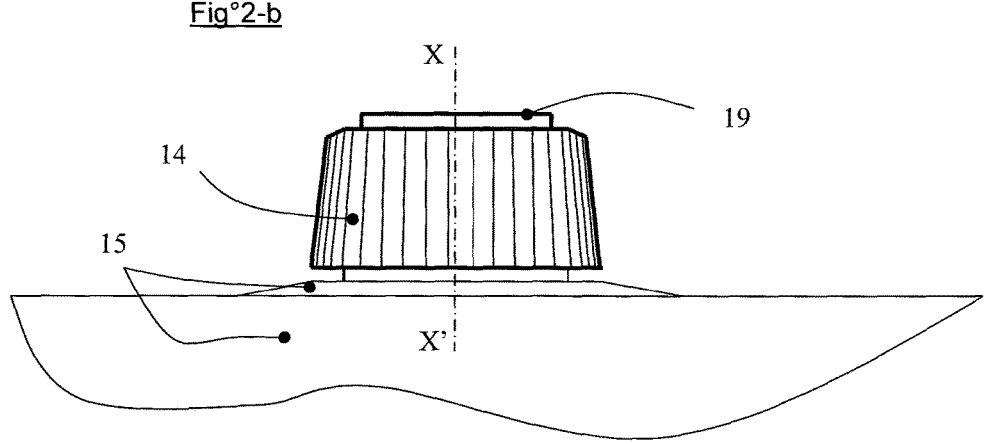

Fig°3 - a
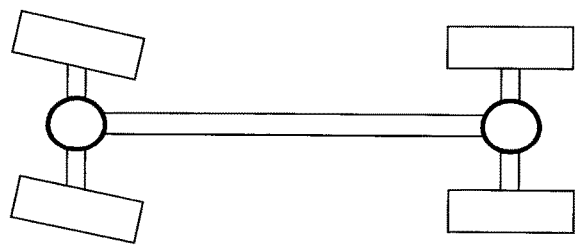
Fig°3 - b
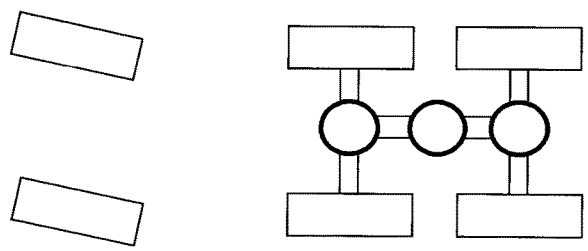
Fig°3 - c
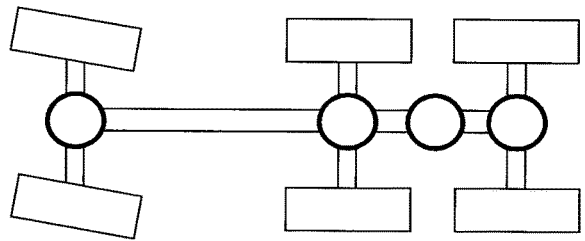
Fig°3 - d
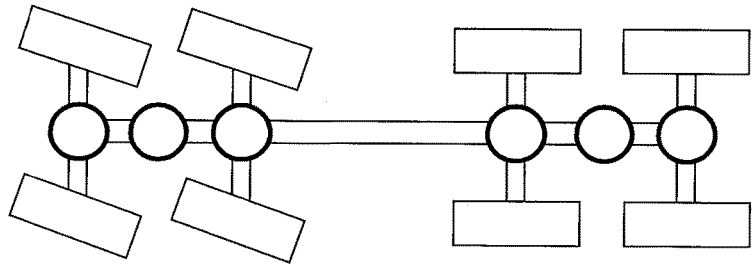

DIFFERENTIAL CONTROL SYSTEM FOR A MOTOR VEHICLE

BACKGROUND AND SUMMARY

The invention concerns a system for controlling the locking or unlocking of the differentials in a vehicle, in particular in a truck comprising one or several differentials.

Traditionally, in car or trucks, driving wheels are interconnected and driven thanks to differential(s) in order to authorize a relative speed between driving wheels to allow for instance the vehicle to turn more easily along a curve of the road without loss of adherence and to save fuel consumption.

Depending on the axle and differential set-up of the vehicle, the number of differentials may range from one up to six, or sometimes more.

In some vehicles like four-wheel drive vehicles or in some heavy duty trucks, at least some of the differentials may be locked thanks to corresponding differential locks. The unlocking or locking of each differential is controlled by a dedicated push button or knob having two positions and that can be manually operated by the driver in order to control the corresponding differential lock that locks the differential. Such locking means are very useful in order to cancel relative speed between driving wheels and to avoid loss of drivability when, for instance, one wheel is wheel-slipping.

The use of a push button to lock or unlock each differential is an interface easy to use provided that there are not too many differentials that have to be separately locked or unlocked. In case of many independent differentials, the dashboard could be provided with a lot of push buttons that would cause the driver to take longer time to select a locking configuration of the differentials. Another consequence of such arrangement is that it increases the risk of confusion for the driver and the risk to lock the wrong differential.

To solve these issues, it is known, for example from WO 2009/154553, to use a manually operable switch button that can be rotated around a central axis in order to choose between several locking or unlocking configurations of the differentials.

Such system offers a simplified human interface that is easier to use than several push buttons.

However, a disadvantage of this solution is that the physical position of the switch button is irremediably associated to a locking configuration and so the switch button denotes the status of the locking configuration that is implemented and therefore, a given switch button is irremediably associated to a given axle and differential set-up of the vehicle.

A consequence of such solution is that, in case of numerous differential locking and unlocking configurations, the different positions of the switch button to select one or another configuration can be very close from each other because they have to be spread over a 360° rotation, so that it increases the risk for the user to select the wrong configuration.

Furthermore, this switch button is dedicated to one axle and differential set-up and it can't be easily modified so that it can't be easily used with another vehicle having a different axle set-up.

A further disadvantage of the system disclosed in WO 2009/154553 occurs when the driver decides to rotate the switch button in order to lock one or several differential because when he does it, he also has to visually match the position of the switch button with an indicator that corresponds to the chosen configuration. Therefore, if the control member is not positioned within the viewing field of the driver, the driver has to look away from the road or to stop the vehicle to lock a differential.

It therefore appears that, from several standpoints, there is room for improvement in systems that allow to control locking/unlocking positions of differentials in a vehicle.

In this technical context, an object of the invention is to improve the system for controlling the locking or unlocking positions of differentials which can overcome the drawbacks of the prior art systems.

To this end an aspect of the invention concerns a differential control system for a motor vehicle having driving wheels, drive shafts to transmit driving power from the motor to the driving wheels and at least one differential to interconnect drive shafts.

The differential control system comprises:
- at least one differential lock which is able to operate the differential into at least a locked or an unlocked state,
- a controller that controls the differential lock,
- a manually operable control member freely rotating bidirectionally around at least one axis,
- an encoder connected to the control member to convert a rotation of the control member into a signal fed to the controller which controls' the differential lock in order to operate the differential into at least a locked or an unlocked state.

Depending on the type of differential lock, it is also possible to operate, the differential into intermediate states between a fully locked and a fully unlocked state.

The adverb "freely" means that the angular position of the control member doesn't assign by itself a locked or unlocked state, or doesn't assign a locking configuration as defined hereafter. That also means that the control member has no angular end position and may be operated on several complete rotations around the rotation axis.

The encoder may be located between the control member and the controller, or it may be integrated into the control member or into the controller.

The invention also concerns according to an aspect thereof motor vehicles having at least two differentials, in such case the differential control system may comprise several differential locks controlled by the controller in order to operate the differentials into different locking configurations where each differential can be operated into at least a locked or an unlocked state.

According to an aspect of the invention, it is understood that for the same locking configuration one or some differentials can be operated in a locked state whereas one or some other differentials can be operated in an unlocked state. It is also understood that a locking configuration may also be a configuration where all the differentials are unlocked.

The fact that the control member can freely rotate and therefore has no predefined position in relation to a locked or unlocked state or to a locking configuration makes it possible to disconnect the actual position of the control member from the current locking configuration. Thus, a locking configuration is not bound by a position of the control member, unlike with a conventional switch wherein the position of the switch sets the vehicle differential locking configuration.

Unlike prior differential control system wherein a control member rotates adjacent to a series of reference numbers that indicate the differential locking configuration, that is implemented, the inventive control system doesn't rely the angular position of the control member to implement a given locking configuration. Consequently, there is no need to use reference numbers or any other indicator to mark the angular position of the control member according to the invention. Another advantage of the present invention is that the driver no longer needs to visually check the position of the control member. Operation of the inventive control system proves to be significantly easier and more user friendly than conventional system.

A further advantage is that the same control member can be used in different vehicles having different axle and differential set-ups. For the vehicle manufacturer, the possibility to assemble the same component or spare part in different vehicles is a great advantage for the supply chain.

Another advantage is that selection of the different locking configurations of the differentials can be spread over a range of rotation of the control member that is not limited to 360°.

According to advantageous but optional features, considered on their own or in any technically feasible combination:

In a preferred aspect of the invention, the control member, the encoder and, the controller are configured so that a manual rotation of the control member allows to select one locking configuration and a further rotation of the control member to select a new locking configuration.

In the present invention, the controller implement a new configuration depending on an electric or electronic signal received from the encoder and which preferably corresponds to the angular amplitude of a manual rotation of the control member.

In an embodiment of the invention the control member, the encoder and the controller are configured so that a new locked/unlocked state or new locking configuration could be implemented only if the rotation of the control member exceeds a predetermined angular amplitude threshold.

Such an angular amplitude threshold is preferably determined before the motor vehicle is used by the end user and may be determined by the vehicle manufacturer itself. Such a predetermined angular amplitude threshold may be comprised between 10 and 180° and preferably between 30 and 60°.

It can be envisaged that the predetermined threshold angular amplitude is different depending on the new locking configuration that is selected.

In another embodiment of the invention the controller is configured to authorize the implementation of a new locking configuration only after a predetermined period of time following the selection of the previous locking configuration.

Such a predetermined period is preferably determined before that the vehicle is used by the end user, it may be determined by the vehicle manufacturer itself and may be comprised between 1 and 5 seconds.

In a further embodiment of the invention the control member, the encoder and the controller are configured so that a new locking configuration can be implemented only if the control member is rotated at a rotation speed which is lower than a predetermined speed threshold.

Such a predetermined speed threshold is preferably determined before that the vehicle is used by the end user, it may be determined by the vehicle manufacturer itself and may be comprised between 1 rad/s and 6 rad/s.

In a preferred aspect of the invention, the rotation of the control member in one direction allows to increment locking configurations and the rotation of the control member in the other direction allows to decrement locking configurations.

In another preferred aspect of the invention, the differential control system is able to operate in an automatic mode. In this case the controller controls the differential locks in order to modify the locking configuration regardless of the current angular position of the control member.

It can be envisaged that, in the automatic mode, the controller is configured to refuse the implementation of a new locking configuration depending on at least one vehicle parameter and/or road condition parameter and/or weather condition parameter.

In particular the controller can be configured to refuse the implementation of a new locking configuration if it can't be operated in a safety manner.

The vehicle parameter may at least comprise the speed of the vehicle and the controller may refuse to implement a new configuration if the speed of the vehicle is above a speed threshold. Such a speed threshold may be determined by the vehicle manufacturer itself and/or may be modified after by a professional who is authorized.

It can also be envisaged that, in the automatic mode, the controller is able to automatically operate a new locking configuration depending on at least one vehicle parameter and/or road condition parameter and/or weather condition parameter.

The vehicle parameter may comprise at least the speed of the vehicle and the controller may automatically unlock at least one differential when the speed of the vehicle reaches a speed threshold. This new predetermined speed threshold can be the same than the preceding one (about 30 km/h) or may be different and the controller preferably unlocks all the differentials when the speed of the vehicle reaches the speed threshold.

In another embodiment of the invention the differential control system also comprises rotation speed sensors located in the vehicle in order to measure the speed of each driving wheel. Rotation speed sensors transmits speed data to a CPU (Central Processing Unit) which compares rotation speeds of the driving wheels to determine a relative speed between opposite driving wheels. In this case the controller is configured to lock at least one differential when the relative speed between the corresponding driving wheels exceeds a predetermined rotation speed threshold.

The CPU could be a dedicated one that is independent from the controller or could be the CPU of the controller.

The predetermined rotation speed threshold is preferably determined before the motor vehicle is used by the end user, it may be determined by the vehicle manufacturer itself.

In a motor vehicle that also comprises a main electrical circuit, it can also be envisaged that, in an automatic mode, the controller is configured to implement a default configuration when the main circuit is turned OFF or when the motor is restarted after that the main circuit has been turned OFF. The default configuration may be a configuration where for instance all the differentials are in an unlocked state.

Preferably, in the automatic mode, the controller is configured to maintain a current locking configuration for a preset period of time when the main circuit is turned OFF and then when the main circuit is turned ON after said preset period of time the controller controls the differential locks in a default configuration where for instance all the differentials may be operated in an unlocked state.

It can be envisaged that the differential control system also comprises a second control member which is manually operable. This second control member may be located in the center of the first control member and may be movable according to different directions than the first control member. An actuation of the second control member may allow to command a further function of the system.

In a particular embodiment of the invention, the second control member is connected to the controller in such a way that a manual action on it implements a default configuration. The default configuration may be a configuration where for instance all the differentials are in an unlocked state.

In another particular embodiment, the second control member is connected to the first control member so that a manual action on the second control member locks in rotation the first control member.

The differential control system according to any one of the preceding characterized in that it also comprises a display device to inform the driver about the locking or unlocking state of each differential.

BRIEF DESCRIPTION OF THE DRAWINGS

The invention will now be explained in correspondence with the annexed figures, as an illustrative example. In the annexed figures:

FIG. 1 is a schematic view of a differential control system according to the invention;

FIG. 2a-2b are different schematic views of a controller member such as represented in FIG. 1;

FIG. 3a-3d are schematic views of different axles and differential configurations.

DETAILED DESCRIPTION

The differential control system 1 is part of a motor vehicle that has a motor, driving wheels, a power transmission that is adapted to transmit driving power from the motor to the driving wheels via drive shafts interconnected to each other by at least one differential. Without limitation the vehicle could be a four-wheel drive vehicle or a truck and the motor could be an internal combustion engine or an electric machine or a combination of both.

Conventionally, in a vehicle comprising two driving wheels the vehicle is equipped with one differential and in a vehicle comprising at least four driving wheels, the vehicle can be equipped with at least two differentials.

In the axle and differential set-up represented in FIG. 1 the vehicle 2 comprises six driving wheels 13 mounted on three driven axles 3, 4, 5 and four differentials 6-9 wherein each differential comprises a differential lock (not represented).

The front driven axle 3 is also a steering axle. Each driving axle comprises two. end drive shafts $3a$, $3b$; $4a$, $4b$; $5a$, $5b$ interconnected by a differential 6, 7, 8. The power generated by the motor (not represented) is transmitted to the end drive shafts $3a$, $3b$; $4a$, $4b$; $5a$, $5b$ via a gearbox (not represented), a main propeller drive shaft 10 (partially represented), a transfer gearbox 11 and secondary propeller drive shafts 12. As represented in FIG. 1 a differential 9 can also be interposed between two propeller drive shafts $12c$, $12d$ and can also be operated thanks to the differential control system 1 according to the invention. The transfer gearbox 11 may also include a differential and corresponding differential lock.

Of course the use of the invention is not limited to the axle and differential set-up of FIG. 1. Without limitation it can for example be envisaged to use the invention in different set-ups such as illustrated in FIG. 3 and for instance in a two driving axles and two differential arrangement (FIG. 3-$a$), in a two driving axles and three differential arrangement (FIG. 3-$b$), in a three driving axles and four differential arrangement wherein one driving axle is also a steering axle (FIG.

3-$c$ and FIG. 1), or in a four driving axles and six differential arrangement wherein two driving axles are also steering axles (FIG. 3-$d$).

In the embodiment of FIG. 1, each differential 6-9 is associated with one differential lock (not represented) of the differential control system 1. Each differential lock is able to operate a differential 6-9 into at least a locked or an unlocked state. In an unlocked state a differential 6-9 authorizes a relative speed between its outputs. In other words, in an unlocked state a differential '6-9 authorizes rotation speeds that could be different between the drive shafts $3a$, $3b$; $4a$, $4b$; $5a$, $5b$; 12 that are connected to the same differential 6, 7, 8, 9. To the contrary, when the differential is in a locked state there is no relative speed between the drive shafts.

Depending on the type of differential lock that is used, it is also possible to operate the differential 6-9 into intermediate states between a fully locked and a fully unlocked state. Intermediate states could be for instance obtained by using a friction brake as differential lock. A such brake authorizes sliding frictions between two end positions.

The differential locks allow to operate the differentials into different locking configurations.

In the exemplary embodiment of FIG. 1, the different locking configurations may be the following:

configuration 1: all differential locks are controlled in order to operate all the differentials 6-9 in an unlocked state;

configuration 2: only rear differential locks are controlled in order to operate the rear differentials 7 and 8 in a locked state;

configuration 3: the rear differential locks are controlled in order to operate the rear differentials 7, 8, 9 in a locked state whereas the front differential lock is controlled to operate the front differential 6 in an unlocked state;

configuration 4: all the differential locks, including the one that may be included in the transfer gearbox 11, are controlled in order to operate all the differentials 6-9 in a locked state.

As schematically illustrated on FIGS. 1 and 2, the differential control system 1 also includes a control member 14 that can freely rotate around at least one axis. The control member 14 can manually rotate clockwise as well as counterclockwise and it does not a have any end positions in terms of rotation. The control member 14 can be suitably positioned on a vehicle dashboard 15 (partially represented) in order to be easy to reach by the driver (or any other user).

The rotation of the control member 14 may be smooth and continuous, but t will preferably be provided with discrete notches opposing a low resistance when the control member is turned by the driver.

In one embodiment, the control member 14 can be cylindrical, in the form of a wheel, but it can also be of any one other shape which could be convenient for the driver.

Rotation that is transmitted by the driver to the control member 14 is converted into an electric and/or electronic signal by a suitable encoder 16 and the electric and/or electronic signal is transmitted to a controller 17 that controls the differential locks. The controller 17 preferably incorporates a CPU (Central Processing Unit) and a non-volatile memory such as a ROM (Read Only Memory). The controller 17 may also include other conventional components such as volatile memory such as RAM (Random Access Memory), an input interface circuit, an output interface circuit and the like. The CPU can be programmed to control differential locks to operate differentials 6-9 in different predefined locking configurations (configurations 1-4) such as stated here before.

Preferably, the electric or electronic signal transmitted by the encoder 16 to the controller 17 can be representative of a displacement of the control member 14.

The different locking configurations are preferably stored, in the non-volatile memory of the controller 17, as a list of predefined configurations. Locking configurations are ordered in the list and may be ordered in the list according to a rank that is attributed to each configuration. Ranks can be 1, 2, 3, 4 that respectively correspond to configuration 1, configuration 2, configuration 3 and configuration 4 such as stated here before.

The list can be defined by the vehicle manufacturer itself or by an authorized professional.

With the exemplary embodiment, a clockwise rotation or a counterclockwise rotation of the control member 14 is converted by the encoder 16 into an activation signal that can be stored in a volatile memory of the controller 17.

A clockwise rotation of the control member 14, can cause the controller 17 to select in the list a new configuration by incrementing the current rank by one or several units. Therefore successive clockwise rotations of the control member 14 or a continuous clockwise rotation of the control member 14 can allow the driver to increment directly or step by step the locking configurations from the configuration 1 until the configuration 4. To the contrary a counterclockwise rotation or several counterclockwise rotations of the control member 14 can decrement the differential locking configurations from the current configuration until the configuration 1.

The angular amplitude of the control member rotation (clockwise or counterclockwise) corresponding to an incrementation or decrementation of the differential locking configuration (for example an incrementation from configuration 2 to configuration 3) may be set according to a vehicle set-up; as an example, an angle of 10° to 180° and preferably from 30° to 60° can materialize a change of configuration.

In a variant of the invention, the angular amplitude of the control member rotation that is necessary to change of configuration could be different depending on the new locking configuration that has to be implemented.

For instance angular amplitude needed to change from configuration 1 to 2 and from configuration 2 to 3 can be above 45°, whereas the last incrementation to change from configuration 3 to configuration 4 (locking of all differentials) may request from the driver to turn the control member 14 with a greater angular amplitude. A such greater angular amplitude is for instance above 60° and preferably above 90°.

Having a such angular difference to implement different configurations is a clear advantage and can allow for instance to improve safety by avoiding the driver to engage by mistake a wrong configuration that could cause the driver to be surprised because of an unexpected modification of the vehicle steering behavior.

Furthermore, the controller 17 could be configured so that one manual rotation of the control member 14 allows to implement directly not the immediately next but a subsequent configuration. For instance, when the minimum angular amplitude to implement a new locking configuration is 45°, a continuous rotation of the control member with an angular amplitude that is more than 90° may allow to increment the locking configuration directly from configuration 1 to configuration 3 and a rotation more than 120° may allow to increment the locking configuration directly from configuration 1 to configuration 4.

To the contrary, the controller 17 could be configured so that it authorizes the engagement of a new locking configuration only after a predefined period of time following the selection by the driver of the previous locking configuration. The predefined period of time may be comprised for instance between 1 and 5 seconds. Such a control allows to avoid that the user, in case of quick rotation of the controller member, selects an incorrect configuration. For instance, when a such additional control is not provided, in case of a quick rotation of the control member 14 the user could select a differential locking configuration where all the differentials 6-9 are locked (configuration 4) whereas the initial intention of the driver was to implement the configuration where only differentials 7 and 8 should be locked (configuration 2).

The control member 14, encoder 16 and the controller 17 could also be configured so that a new locking configuration can be engaged only if the control member 4 is rotated at a speed which is lower than a predetermined threshold speed. A such predetermined threshold speed could be comprised between 1 rad/s and 6 rad/s and preferably may be about 3 rad/s. Thanks to such additional control, it is for instance avoided that an inadvertent rotation of the control member leads to an incrementation or decrementation of differential locking configuration(s).

The preceding additional controls, are made possible because the position of the control member 14 is independent from the actual locking configuration. Thanks to this advantage, in case of an improper rotation of the control member 14 that doesn't result in the implementation of a new configuration, the user always keeps the possibility to rotate again the control member 4 regardless of its last position.

As previously explained, the fact that the control member 14 can freely rotate, and has no predefined position in relation to a differential locking configuration allows to make the current position of the control member 14 independent of the current locking configuration. Thanks to this advantage, the controller 17 may automatically manage locking configurations depending on at least a vehicle parameter(s) and/or road condition parameter(s) and regardless of the current position of the control member 14. Because there is no need in the present invention to use reference numbers or any other indicator to mark the angular position of the control member 14, the position of the control member 14 doesn't reflect a contradictory information that could confuse the driver about the locking configuration that is automatically implemented.

In the automatic mode the controller can be configured to automatically implement a default configuration when the main circuit (not represented) of the vehicle is turned OFF or when the motor is restarted after that the driver has turned OFF the main circuit. Such a default configuration may be a configuration where all the differentials 6-9 are unlocked (configuration 1)

Alternatively, the controller 17 can be configured to maintain a current locking configuration for a preset period of time when the main circuit of the vehicle is turned OFF. Then, when the main circuit is turned ON after said preset period of time, the controller 17 may automatically implement a default configuration where for instance all the differentials 6-9 can be unlocked (configuration 1).

In other words, when the user turns ON the main electrical circuit within the preset period of time, the differential locking configuration remains unchanged and when the user turns ON the main electrical circuit after the preset period of time the controller 17 controls the differential locks in the default configuration.

Thus, the invention makes it possible to retain in the controller 17 for a certain amount of time the differential locking configuration that was previously selected by the user.

The inventive system proves to be especially advantageous when the vehicle main electrical circuit is turned OFF during a short period of time.

Said preset period of time could be comprised between 5 and 20 minutes.

Although a differential locking configuration has been automatically modified or implemented by the controller 17, the driver may override the automatic selection and select a new differential locking configuration regardless of the last position of the control member 14 provided that it could be implemented in a safety manner such as explained hereafter.

This is also made possible because the position of the control member is independent from the locking configuration that is currently implemented. A further reason is that the control member according to the invention can be made free of any marks or references that are usually used, as described in WO 2009/54553, to indicate which configuration is implemented.

The controller 17 can also be configured in order to refuse to operate a new locking configuration that has been manually selected by the user thanks to the control member if such a configuration can't be operated in a safety manner. For instance, the controller 17 may refuse to lock all the differentials (configuration N°4) if the vehicle speed reaches or exceeds a speed threshold that could be 30 km/h.

In another variant of the invention, the controller 17 can also be configured in order to automatically operate a new differential locking configuration depending on at least one vehicle parameter and/or one road condition parameter and/or one weather condition parameter such as vehicle speed, type of road (highway, secondary road, city road . . . ), slopes and curves of the road that the vehicle is riding on, . . . temperature . . . etc. . . . . .

To determine if the vehicle is for instance on a highway, in urban traffic, on a bend or a straight portion of the road or is going to take such a road or such a portion, the controller may for instance receive and treat data from a positioning system or a navigation system 18.

The system 1 can also comprise rotation speed sensors located in the vehicle in order to measure rotation speed of driving wheels. The speed data measured by rotation speed sensors are transmitted to the controller 7 which compares rotation speed of opposite driving wheels in order to determines the relative speed between driving wheels.

Alternatively, speed data measured by rotation speed sensors can be transmitted to a dedicated controller of the vehicle that is different from the controller of the inventive system. In this case it is the dedicated controller which compares rotation speed of opposite driving wheels and which determine the relative speed between driving wheels.

The dedicated controller or speed sensors can communicate with the controller 17 of the inventive system 1 via a CAN-BUS (Control Area Network Bus) or via LIN-BUS (Local Interconnect Network Bus) or other communication device depending on vehicle equipment.

If the controller 17 determines, directly or indirectly thanks to a dedicated controller, that the relative speed is above a predetermined rotation speed threshold, the controller 17 may automatically control the corresponding differential lock(s) in order to lock the corresponding differential(s) provided that they can be locked without compromising safety of the vehicle and/or durability of its components.

As above explained, there is no relation between the current position of the control member and the locking configuration that is currently implemented. Thanks to that, in an automatic mode, the controller 17 may automatically increment, decrement or forbid a differential locking configuration without disturbing the driver by a contradictory information that could result from the position of a control member 14 such as disclosed WO 2009/154553, the angular position of which determines which configuration is engaged.

The automatic mode can be automatically activated and deactivated by the controller 17 or alternatively can be manually activated and deactivated by the driver who for instance can use a dedicated push or switch button or use an additional control member 19 that may be located in the center of the first control
member and that can be movable according to a different movement than the rotation of the first control member 14.

As described above, the system can be provided with a second control member 19 that is preferably located at the center of the first control member 14 (see FIG. 2) and that is movable according to different directions than the first control member 14.

Instead of being used to activate or deactivate manually the automatic mode, this second control member may be a push button 19 that is used to implement directly a predefined locking configuration by one manual action. For instance, an activation of the push button may unlock all the differentials. The push button 19 can be moveable in translation along the rotation axis X-X' of the first control member 14 and can be moveable between a rest position and a pressed position. The central location of the push button 19 is a particularly advantageous location because it. can allow the driver to intuitively and spontaneously unlock all the differentials in case of an emergency situation. Such an emergency situation may occur in case of unexpected deterioration of the road conditions or weather conditions.

In this embodiment the second control member 19 is used as an emergency push button that is able to quickly override all previous selections of differential locking configurations.

The second control member 19 could also be used to lock and unlock in rotation the first control member 14 or to disconnect physically or logically the rotation of the control member 14 from the encoder 16 in order to ignore any rotation of the control member 14. Thanks to this advantage, it is possible to avoid the implementation of a new locking configuration when the control member 14 is operated by mistake or in a fortuitous manner by the driver.

The same push button (second control member 19), that is already used to activate or deactivate manually the automatic mode, can in addition be used to lock and unlock the rotation of the first control member 14 by providing at least an intermediate position between said rest position and said pressed position. In this case the second control member 19 is able to operate two different functions and the intermediate position of the control member 9 is used to lock in rotation the first control member 14.

In a different embodiment, a third control member (not represented) that may also be located at the center of the first control member 14 and/or on the second control member 19 can be used to lock and unlock the rotation of the first control member 14. This third control member may be operated according to a different actuation movement compared with actuation movements of first and second control members 14, 19.

In another embodiment, the first control member 14 is movable according to a second actuation movement that could be for instance a vertical or horizontal movement of the first control member 14, along the X-X' axis, in order to lock and unlock the rotation of the first control member 14 or in order to operate a further function.

A further advantage of the invention is that when a differential locking configuration is chosen by the driver, no visual control on the control member 14 is required. Therefore, the control member 14 does not have to be positioned within the visual scope of the driver. It is an advantage because it is often difficult to locate control members 14 in the field of view of the driver.

Optionally, the controller 20 can also be connected to a display device 20 (FIG. 1) located on the dashboard 15 of the vehicle in order to inform the driver about the locked or unlocked state of each differential 6-9. The display device 20 can be a dedicated device or use a current display device of the vehicle. Preferably the display device is located in the field of view of the driver so that the driver may easily check which differential 6-9 is locked and which other in unlocked and at the same time stay concentrated on the road.

In order to be more user-friendly, the display device 20 may use a schematic representation 21 of axle and differential arrangement of the vehicle. On the schematic representation, differential(s) that is/are locked can appear in a specific color 22 (black color on FIG. 1) and differential(s) that is/are unlocked can appear in another color 23 (white color on FIG. 1).

For instance, on display device of FIG. 1, it clearly appears that rear differentials 7, 8, 9 are in a locked state whereas the front differential 6 in an unlocked state. So differential locking configuration in FIG. 1 corresponds to the configuration N°3 such as above detailed.

The display device may also indicate if the system is operated in a manual mode or in an automatic mode thanks to specific light signals 24, 25.

The controller 17 can also be connected to the vehicle audio system; an audio signal can be emitted when the first control member 14 has been rotated according to the preset angular amplitude meaning that a differential locking configuration is incremented or decremented.

In a variant of the invention and thanks to a human interface (not represented) connected to the controller 17, an authorized professional may modify the list of locking configurations stored in the controller 17.

In a further variant of the invention several and different lists of predefined locking configurations may be stored in the non-volatile memory of the controller 17. In this case each list corresponds to a set of configurations that is different from one list to the other. The controller 17 may automatically implement one or the other list depending on at least a vehicle parameter and/or a road condition parameter and/or a weather condition parameter.

For instance, a first list can be implemented by the controller 17 at a low speed of the vehicle (<30 km/h) whereas the second list is implemented at a normal speed of the vehicle.

TABLE 1

| Configuration order | List 1 (<30 km/h) | List 2 (>30 km/h) |
|---|---|---|
| 1 | All the differentials 6-9 are unlocked | All the differentials 6-9 are unlocked |
| 2 | Only rear differentials 7 and 8 are locked | Only rear differential 9 is locked |
| 3 | Rear differentials 7, 8, 9 are locked and front differential is unlocked | |
| 4 | All the differentials 6-9 are locked | |

It clearly appears from embodiment represented in table I that configurations such as predefined in the first list can be different by themselves from configurations defined in the second list. In other words a configuration of a first list may have no equivalent in a second list.

Configurations predefined in each list can be the same but in a different order between each list, so that the same sequence of actions on the control member 16 will not implement the same locking configurations.

Therefore, depending on the list that is selected by the controller 17, successive rotations of the controller member 14 will not implement the same locking configurations. Thanks to that, locking configurations may be implemented in an order that remain logical and best suited for the driver under different situations.

In another alternative there is only one list stored in the non-volatile memory of the controller. The controller 17 selects relevant locking configurations depending on at least a vehicle parameter and/or a road condition parameter and/or a weather condition parameter and reorders them in such a manner that the order of implementation of the locking configurations remain a logical order for the driver when he rotates the control member 14.

It should be understood that the invention is not restricted to the embodiment described above by way of non-limiting example, but on the contrary it encompasses all embodiments thereof.

The invention claimed is:

1. A differential control system for a motor vehicle having driving wheels, drive shafts to transmit driving power from the motor to the driving wheels and at least one differential to interconnect drive shafts, the differential control system comprising
    at least one differential lock which is able to operate the differential into a locking configuration where the differential is operated into at least a locked or an unlocked state,
    a controller that: controls the differential lock,
    a manually operable control member freely rotating bidirectionally around at least one axis such that the position of the control member is independent from the locking configuration, and
    an encoder connected to the control member to convert a rotation of the control member into a signal fed to the controller which controls the differential lock in order to operate the differential into a locked or an unlocked state.

2. The differential control system according to claim 1 for a motor vehicle having at least two differentials, wherein the differential control system comprises differential locks controlled by the controller in order to operate the differentials into different locking configurations where each differential is operated into at least a locked or an unlocked state.

3. The differential control system according to claim 2, wherein the control member, the encoder and the controller are configured so that a manual rotation of the control member allows to select one locking configuration and a further rotation of the control member to select a new locking configuration.

4. The differential control system according to claim 1, wherein the control member, the encoder and the controller are configured so that a new locked or unlocked state or new locking configuration can be implemented only if the rotation of the control member exceeds a predetermined angular amplitude threshold.

5. The differential control system according to claim 4, wherein the predetermined angular amplitude threshold is different depending on the new locking configuration that is selected.

6. The differential control system according to claim 2, wherein the controller is configured to authorize the implementation of a new locking configuration only after a predetermined period of time following the selection of a previous locking configuration.

7. The differential control system according to claim 2, wherein the control member, the encoder and the controller are configured so that a new locking configuration can be implemented only if the control member is rotated at a rotation speed which is lower than a predetermined speed threshold.

8. The differential control system according to claim 2, wherein the rotation of the control member in one direction allows to increment locking configurations and the rotation of the control member in the other direction allows to decrement locking configurations.

9. The differential control system according to claim 2, wherein it is able to operate in an automatic mode wherein the controller controls the differential locks in order to modify the locking configuration regardless' the current angular position of the control member.

10. The differential control system according to claim 9, wherein, in the automatic mode, the controller is configured to refuse the implementation of a new locking configuration depending on at least one vehicle parameter and/or road condition parameter and/or weather condition parameter.

11. The differential control system according to claim 10, wherein a vehicle parameter comprises at least the speed of the vehicle and the controller refuses to implement a new configuration if the speed of the vehicle is above a speed threshold.

12. The differential control system according to claim 9, wherein, in the automatic mode, the controller is able to automatically operate a new locking configuration depending on at least one vehicle parameter and/or road condition parameter and for weather condition parameter.

13. The differential control system according to claim 12, wherein a vehicle parameter comprises at least the speed of the vehicle and the controller, automatically unlocks at least one differential when the speed of the vehicle reaches a speed threshold.

14. The differential control system according to claim 12, wherein it also comprises rotation speed sensors located in the vehicle in order to measure the speed of each driving wheel, rotation speed sensors transmitting speed data to a CPU which compares rotation speeds in order to determine a relative speed between opposite driving wheels, the controller being configured to lock at least one differential when the relative speed between, the corresponding driving wheels exceeds a predetermined rotation speed threshold.

15. The differential control system according to claim 9, for a motor vehicle that also comprises a main electrical circuit, wherein, in an automatic mode, the controller is configured to implement a default configuration when the main circuit is turned OFF or when the motor is restarted after that the main circuit has been turned OFF.

16. The differential control system according to claim 9, for a motor vehicle that also comprises a main electrical circuit, wherein, in the automatic mode; the controller is configured to maintain a current locking configuration for a preset period of time when the main circuit is turned OFF and, when the main circuit is turned ON after the preset period of time, to control the differential locks in a default configuration.

17. The differential control system according to claim 1, wherein it also comprises a second control member which is manually operable, which is located in the center of the first control member and which is movable according to different directions than the first control member and wherein an actuation of the second control member allows to command a further function of the system.

18. The differential control system according to claim 17, wherein the second control member is connected to the controller in such a way that a manual action on it implements a default configuration.

19. The differential control system according to claim 17, wherein the second control member is connected to the first control member so that a manual action on the second control member locks in rotation the first control member.

20. The differential control system according to claim 1, wherein it also comprises a display device to inform the driver about the locked or unlocked state of each differential.

* * * * *